United States Patent [19]
Schreyer et al.

[11] 3,887,490
[45] June 3, 1975

[54] PROCESS FOR REGENERATING NOBLE METAL CATALYST FOR THE SYNTHESIS OF HYDROGEN PEROXIDE ACCORDING TO THE ANTHRAQUINONE PROCESS

[75] Inventors: Gerd Schreyer; Ferdinand Theissen, both of Grossauheim; Otto Weiberg, Neuisenburg; Wolfgang Weigert, Offenbach, all of Germany

[73] Assignee: Deutsche Gold- und Silber-Scheideanstalt vormals Roessler, Germany

[22] Filed: Aug. 20, 1973

[21] Appl. No.: 389,543

Related U.S. Application Data
[63] Continuation of Ser. No. 174,234, Aug. 23, 1971, abandoned.

[30] Foreign Application Priority Data
Aug. 27, 1970 Germany.............................. 2042523

[52] U.S. Cl. ................ 252/414; 423/588; 423/589; 423/590
[51] Int. Cl. ....................... B01j 11/18; C01b 15/02
[58] Field of Search ............ 252/414, 412; 423/588, 423/589, 590

[56] References Cited
UNITED STATES PATENTS

| | | | |
|---|---|---|---|
| 2,657,980 | 11/1953 | Spraver............................... | 423/590 |
| 2,692,240 | 10/1954 | Sprauer............................... | 252/414 |
| 3,635,841 | 1/1972 | Keith et al. ......................... | 423/588 |

FOREIGN PATENTS OR APPLICATIONS

| | | | |
|---|---|---|---|
| 922,021 | 3/1963 | United Kingdom................. | 252/415 |

*Primary Examiner*—Winston A. Douglas
*Assistant Examiner*—P. E. Konopka
*Attorney, Agent, or Firm*—Cushman, Darby & Cushman

[57] ABSTRACT

In situ regeneration of noble metal catalysts for the synthesis of hydrogen peroxide by the anthraquinone process is provided by employing as the working solution coming from the extraction or desorption step and being introduced into the hydrogenation step a solution which contains at least 250 mg/liter of hydrogen peroxide, to thereby completely regenerate the noble metal catalyst by full capacity of the hydrogenation step.

7 Claims, No Drawings

PROCESS FOR REGENERATING NOBLE METAL CATALYST FOR THE SYNTHESIS OF HYDROGEN PEROXIDE ACCORDING TO THE ANTHRAQUINONE PROCESS

This is a continuation, of application Ser. No. 174,234 filed Aug. 23, 1971 now abandoned.

The invention is directed to a process for the in situ regeneration of noble metal catalysts employed in the anthraquinone process in which there is employed as the active metal a metal or mixture of metals of the platinum group of the periodic system. Preferably the catalyst is added on a carrier.

The noble metal catalysts include platinum, palladium, iridium, rhodium and ruthenium for example.

As is known hydrogen peroxide can be produced in a cyclic process in which anthraquinone compounds are alternately hydrogenated and oxidized. Reduction and oxidation occur in an organic solvent or solvent mixture that contains both the anthraquinone and the anthrahydroquinone compounds in solution. The hydrogen peroxide formed by the oxidation of the hydroquinone to quinone is isolated from the organic phase by known processes and the anthraquinone compound containing working solution is returned to the cycle in the hydrogenation.

In this cyclic process there are undesired side reactions in which compounds of various types are formed. As especially disturbing there have been found resinification and decomposition products of undetermined composition. These compounds for example cause the gradual reduction of the activity in the activity of the hydrogenation catalyst which can lead to excessively high catalyst costs in comparison to the total product costs of the hydrogen peroxide. Customarily a catalyst which is exhausted or has its activity reduced is removed from the plant and subjected to a working up for reactivation. At least the hydrogenation tower is disconnected during the regeneration. Especially in working with solid bed hydrogenation catalysts these methods of operation are time consuming and noticeably costly.

Until the present no truly useful processes for the reactivation of the catalyst in situ have been known.

To be sure German Pat. No. 1,055,513 specifies a process of revival for a hydrogenation catalyst of the anthraquinone process according to which the catalyst in the hydrogenation step is subjected to a periodic reduction of the hydrogen peroxide pressure with simultaneous introduction of an inert gas. However, the hydrogenation itself must either be very greatly slowed down or even completely interrupted.

Until now it has not been known how to undertake the regeneration of the hydrogenation catalyst at its complete normal rate in the hydrogenation step itself.

It has now been found that noble metal catalyst in which a metal of the platinum group of the periodic system (such as those set forth above), preferably palladium, in a given case in admixture with other metals of the platinum group, e.g., platinum, iridium, rhodium or ruthenium, is deposited on a carrier, e.g., alumina, silica, aluminum silicate or the like, is directly regenerated during the hydrogenation at complete driving capacity in the hydrogenation step, if the working solution coming from the extraction or desorption step which is returned again to the hydrogenation step has a content of reactive hydrogen peroxide of at least 250 mg/liter and up to 30,000 mg/liter.

Preferably the working solution has 300–1000 mg $H_2O_2$/liter.

This amount of hydrogen peroxide can remain in the working solution either by a correspondingly small extraction with water or desorption with organic solvent vapors or it can be reinserted in the working solution after the extraction or desorption, either by addition of a side stream from the oxidation or by addition of 100% hydrogen peroxide or highly concentrated aqueous solutions. These highly concentrated aqueous solutions can be produced most simply and economically by extraction of the solutions of Schreyer et al. applications 856,070 filed Sept. 8, 1969 now abandoned and 79,315 filed Oct. 8, 1970, now U.S. Pat. No. 3,707,444 (and corresponding German published applications P 18-02 003.6 and P 19 51 211.9) and German published application P 20 25 237.3 with correspondingly small amounts of water as set forth in our application filed on even date entitled "Process for the Production of Very Pure Aqueous Hydrogen Peroxide Solutions" (corresponding to German application P 20 42 522.3). The entire disclosures of the Schreyer et al. United States application Ser. Nos. 856,070 and 79,315 as well as the Schreyer et al. application of even date are hereby incorporated by reference.

It is only essential that the working solution before entering the hydrogenation tower possess the reactive amount of hydrogen peroxide of the invention specified above.

It could not be perceived that an amount of hydrogen peroxide of the specified height could maintain the activity of the catalyst during the hydrogenation or again produce such activity. Until now it was only known to increase the catalyst activity by insertion of a specified water content to the working solution, see U.S. Pat. No. 2,867,507. By this procedure, however, there can not be prevented the gradual reduction in the course of time of activity obtained in this manner by poisons in the course of time which are brought in with the working solution. According to the process of the invention these reductions in activity, however, are prevented by inclusion of the recited amounts of hydrogen peroxide.

The experts in art until now were of the opinion that uncharged hydrogen peroxide as well as the active oxygen were detrimental to the hydrogenation catalyst. Even the working solution should be changed in the regular cyclic procedure by the constant presence of hydrogen peroxide. On the contrary it has surprisingly been shown that in the presence of hydrogen neither the catalyst nor the working solution becomes attacked. Also according to the regular cyclic process the working solution was intact. The catalyst retains its original activity and selectivity.

It is even possible to regenerate to the old value a catalyst whose activity has been reduced by the recycling of the until now customary working solution by addition of $H_2O_2$ in the specified amounts to the working solution. In this manner in existing plants there is avoided the costly regeneration apparatus which also require expensive maintenance.

As carriers for the catalyst there are used silica containing materials as well as aluminum oxide and activated carbon.

The catalysts can be employed either as suspension catalysts or as solid bed catalysts.

The regeneration according to the invention, as said, is suited for a plant using water extraction or a plant using desorption of the hydrogen peroxide by organic vapors. In the last case it is especially effective since the hydrogenation catalyst according to experience is there more quickly exhausted than in the water extraction.

As working solutions there can be employed solutions of one or more alkyl anthraquinones in a high boiling solvent stable to oxygen and hydrogen peroxide. As alkyl anthraquinones, there are employed, for example, alkyl derivatives thereof, such as 2-methyl anthraquinone, 2-ethyl anthraquinone, 2-butyl anthraquinone, 2-isopropyl anthraquinone, anthraquinone, 2-sec. amyl anthraquinone, 1,3-dimethyl anthraquinone, 2,7-dimethyl anthraquinone and mixtures of them as well as their partially nuclear hydrogenated derivates, e.g., the tetrahydro anthraquinones such as 2-ethyl tetrahydro anthraquinone. As solvents there have been used, among others, alkyl benzenes such as tetramethyl benzene, paraffins, higher alcohols, naphthalenes such as tetralin (tetrahydronaphthalene), methyl naphthalene, dimethyl naphthalene and esters such as methyl cyclohexyl acetate, trioctyl phosphate, tributyl phosphate.

For stripping (desorbing) there are best suited vapors of substances which dissolve hydrogen peroxide and are not attacked by hydrogen peroxide under the process conditions. For these materials, depending on the later intended use, carboxylic acids, esters, alcohols and esters having 4 to 10, preferably 4 to 8 carbon atoms, ketones having 3 to 7 carbon atoms, have proven suitable. Thus, there can be used carboxylic acids such as formic acid, acetic acid, propionic acid, butyric acid, isobutyric acid, pivalic acid, esters such as ethyl acetate, propyl acetate, butyl acetate, allyl acetate, propyl formate, butyl formate, isobutyl acetate, amyl acetate, isoamyl acetate, methyl propionate, ethyl propionate, methyl butyrate, ethyl butyrate, methyl valerate, methyl isovalerate, isopropyl acetate, 2-ethylbutyl acetate, sec-hexyl acetate, propyl propionate, isopropyl propionate, butyl propionate, isobutyl propionate, amyl propionate, propyl butyrate, isobutyl butyrate, methyl isobutyrate, ethyl isobutyrate, propyl isobutyrate, isopropyl isobutyrate, isobutyl isobutyrate, amyl isobutyrate, ethyl valerate, methyl isovalerate, propyl isovalerate, methyl caproate, alcohols such as propanol, butanol, isobutyl alcohol, amyl alcohol, hexyl alcohol, cyclohexanol.

An especially preferred class of stripping agents are esters of acids of the formula

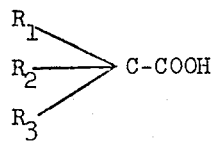

where $R_1$, $R_2$, and $R_3$ are lower alkyl i.e., $R_1$ are alkyls with 1 to 4 carbon atoms and $R_2$ and $R_3$ alkyls with 1 to 4 carbon atoms. Thus, there can be used esters of pivalic acid, 2,2-dimethylpentanoic acid, neodecanoic acid, neotridecanoic acid, 2,2,4,4-tetramethyl valeric acid. Most preferred are lower alkyl esters of pivalic acid such as methyl pivalate, ethyl pivalate, propyl pivalate, isopropyl pivalate, butyl pivalate, sec. butyl pivalate, amyl pivalate and hexyl pivalate. There also can be used, for example, methyl neodecanoate, ethyl neodecanoate, methyl neotridecanoate.

Particularly preferred are esters of aliphatic alcohols, especially methyl to butyl alcohols with acids where $R_1$ is an alkyl group with 1–3 carbon atoms and $R_2$ and $R_3$ are alkyls of 1 to 2 carbon atoms. Most preferred are methyl to butyl esters of pivalic acid (trimethyl acetic acid). In addition to the specific esters just mentioned there can be used, for example, the methyl ester of 2,2-dimethyl valeric acid and the ethyl ester of 2,2-diethyl butyric acid.

There also can be used allyl acetate as well as esters of cycloaliphatic alcohols such as cyclohexyl acetate, cyclohexyl butyrate, cyclohexyl pivalate, cyclohexyl formate, methyl cyclohexyl acetate and cyclopentyl acetate.

Additionally there can be used as stripping agents mixtures of carboxylic acids, esters, ketones or alcohols with aromatic or aliphatic hydrocarbons or hydrocarbon fractions boiling up to 160°C. Illustrative of such a mixture is 60% acetic acid and 40% n-propyl ether.

Besides there can be used aliphatic ethers with 4–10 carbons atoms such as diethyl ether, diisopropyl ether, dibutyl ether, diisobutyl ether, di sec. butyl ether, diamyl ether, di-isoamyl ether, ethyl propyl ether, propyl butyl ether, ethylene glycol dimethyl ether, propylene glycol dimethyl ether, methyl ethyl ether of ethylene glycol, methyl ethyl ether of propylene glycol.

Also there can be used aliphatic ketones with 3–7 carbon atoms, for example acetone, methyl ethyl ketone, methyl isobutyl ketone, cyclohexanone, diisopropyl ketone.

Additional examples of mixtures of stripping agents include, for example, acetic acid-di-n-propyl ether, acetic acid-methyl ethyl ethylene glycol ether, di-isopropyl ether-t-butyl acetate, di-isopropyl ether-t-butyl acetate-benzene, acetic acid-n-butyl acetate, acetone-benzene, propionic acid-propyl propionate, propyl acetate-acetic acid, propyl acetate-propanol. For example, in each of the two and three component mixtures just mentioned there can be used equal parts by volume of each component of the mixture.

Unless otherwise indicated all parts and percentages are by weight.

EXAMPLE 1

A working solution consisting of 150 grams/liter of ethyl anthraquinone and 150 grams/liter of tetrahydroethyl anthra-quinone in a mixture of 60 vol. parts of tributyl phosphate/40 vol. parts methyl naphthalene (a technical mixture of the 1 and 2 isomers) was hydrogenated at 60°C. over a solid bed catalyst (0.3% pd on silica pebbles) corresponding to an $H_2O_2$ content of 30 g/liter and after fine filtration oxidized back with air at 60°C to the anthraquinone/tetrahydroanthraquinone and $H_2O_2$ in an oxidation tower. The $H_2O_2$ was desorbed with butyl acetate in the manner set forth in application Ser. No. 79,315 to obtain a working solution substantially freed of $H_2O_2$ but having a residual content of 0.3 grams/liter of $H_2O_2$ was returned to the hydrogenation tower. (In the event the residual $H_2O_2$ content is below 0.3 g/l it can be raised to that value either by means of adding a side stream from the oxidation step or by adding 10% $H_2O_2$ in butyl acetate.) After 1,200 hours the hydrogenation catalyst showed no loss of activity.

EXAMPLE 2

A working solution of the type set forth in example 1 was freed of $H_2O_2$ to a residual content of 0.001 g/liter of $H_2O_2$. After 12 hours the degree of hydrogenation had fallen to the extent that it only corresponded to 20 g/liter of $H_2O_2$. Then the working solution was desorbed up to a residual content of 0.5–0.8 g $H_2O_2$/liter of working solution and returned to the working solution. After a further 12 hours the complete hydrogenation activity was again attained.

What is claimed is:

1. A process for the in situ regeneration of noble metal catalyst of the platinum group of the periodic system for the synthesis of hydrogen peroxide by the anthraquinone process, said catalyst being deposited on a catalyst consisting of silica, said process comprising introducing into the hydrogenation step of the anthraquinone process an anthraquinone working solution still containing 300 mg/liter up to 1,000 mg/liter of hydrogen peroxide to thereby completely regenerate the noble metal catalyst to full hydrogenation capacity.

2. A process according to claim 1 wherein the catalyst includes palladium.

3. A process according to claim 1 wherein the working solution is extracted or desorbed to reduce the $H_2O_2$ content to 300 mg/liter up to 1,000 mg/liter prior to its introduction into the hydrogenation step.

4. A process according to claim 3 wherein the process is carried out at 60°C.

5. A process according to claim 1 wherein the process is carried out at 60°C.

6. A process according to claim 1 wherein the working solution introduced into the hydrogenation step to regenerate the catalyst directly in the hydrogenation step and the hydrogenated working solution is returned to the oxidation step to form further hydrogen peroxide, the thus formed oxidized working solution is extracted or desorbed to reduce the $H_2O_2$ content to 300–1,000 mg/liter and is then again reintroduced into the hydrogenation step.

7. A process according to claim 6 which is carried out at 60°C.

* * * * *